United States Patent
Abinader, Jr. et al.

(10) Patent No.: US 9,723,631 B2
(45) Date of Patent: Aug. 1, 2017

(54) BULK FINE TIMING MEASUREMENT ALLOCATION MESSAGE

(71) Applicant: MICROSOFT TECHNOLOGY LICENSING, LLC, Redmond, WA (US)

(72) Inventors: Fuad Mousse Abinader, Jr., Manaus (BR); Eduardo Abinader, Manaus (BR)

(73) Assignee: Microsoft Technology Licensing, LLC, Redmond, WA (US)

( * ) Notice: Subject to any disclaimer, the term of this patent is extended or adjusted under 35 U.S.C. 154(b) by 40 days.

(21) Appl. No.: 14/922,854

(22) Filed: Oct. 26, 2015

(65) Prior Publication Data
US 2017/0118772 A1    Apr. 27, 2017

(51) Int. Cl.
*H04W 74/08*   (2009.01)
*H04W 74/00*   (2009.01)
*H04W 56/00*   (2009.01)

(52) U.S. Cl.
CPC ... *H04W 74/0816* (2013.01); *H04W 56/0045* (2013.01); *H04W 74/002* (2013.01)

(58) Field of Classification Search
CPC ......... H04W 74/0816; H04W 56/0045; H04W 74/002
See application file for complete search history.

(56) References Cited

U.S. PATENT DOCUMENTS

| | | | |
|---|---|---|---|
| 6,453,168 B1 | 9/2002 | McCrady et al. | |
| 7,277,413 B2 | 10/2007 | Benveniste | |
| 8,842,571 B1 | 9/2014 | Yu et al. | |
| 9,154,971 B2 * | 10/2015 | Aldana | H04L 43/0864 |
| 2009/0225669 A1 | 9/2009 | Qin et al. | |
| 2010/0260155 A1 | 10/2010 | Grilli et al. | |
| 2014/0187259 A1 | 7/2014 | Kakani et al. | |
| 2014/0213193 A1 | 7/2014 | Zhang et al. | |
| 2014/0254511 A1 | 9/2014 | Aldana et al. | |
| 2014/0295877 A1 | 10/2014 | Hart | |
| 2014/0335885 A1 * | 11/2014 | Steiner | H04W 64/00 455/456.1 |
| 2014/0355462 A1 | 12/2014 | Aldana et al. | |
| 2015/0049716 A1 | 2/2015 | Gutierrez et al. | |
| 2015/0063138 A1 | 3/2015 | Aldana | |
| 2015/0094103 A1 | 4/2015 | Wang et al. | |

(Continued)

OTHER PUBLICATIONS

Lipsky, Jessica., "WiFi Chip Tracks Indoor Location", Published on: Apr. 1, 2014 Available at: http://www.eetimes.com/document.asp?doc_id=1321718.

(Continued)

*Primary Examiner* — Duc C Ho

(57) ABSTRACT

Examples disclosed herein relate to the scheduling and transmission of timing measurements between mobile computing devices in an area to determine the devices' locations. A bulk fine timing measurement (BFTM) allocation message is generated by a scheduling mobile computing device that identifies other mobile computing devices in the area. The BFTM allocation message generated by the scheduling mobile computing device indicates a time of delivery (TOD), a scheduling order for the identified mobile computing devices, and a contention-free period for the mobile computing devices to transmit the timing measurement messages.

20 Claims, 6 Drawing Sheets

(56) References Cited

U.S. PATENT DOCUMENTS

2015/0271776 A1    9/2015   Michaelovich et al.
2016/0183171 A1*   6/2016   Hareuveni ............ H04W 64/00
                                                         370/328
2016/0277197 A1*   9/2016   Jose ...................... H04W 64/00
2016/0366660 A1*  12/2016   Segev ............... H04W 56/0045

OTHER PUBLICATIONS

"Wi-Fi Alliance, Location TTG Timeline", Retrieved on: Jul. 1, 2015 Available at: https://groups_wi-fi.org/login?back=https%3a%2f%2fgroups.wi-fi.org%2fapps%2forg%2fworkgroup%2flocation_ttg%2fdownload.php%2f56767%2fLocation%20TTG%20-%20TTG%20Timeline%20-%2020141217.pptx.

"International Search Report and Written Opinion Issued in PCT Application No. PCT/US2016/055389", Mailed Date: Jan. 24, 2017, 11 Pages.

Ji, Lin., "Increasing Accuracy of Location Determination: Exploiting Phase Change Reconstruction and Timing Measurements", In Master Thesis, Retrieved on: Jun. 29, 2015, 58 pages.

Lipsky, Jessica., "WiFi Chip Tracks Indoor Location", Published on: Apr. 1, 2014. Available at: http://www.eetimes.com/document.asp?doc_id =1321718.

Yang, et al., "WiFi-based Indoor Positioning", In Journal of IEEE Communications Magazine, vol. 53, Issue 3, Mar. 2015, pp. 150-157.

Pritt, Noah, "Indoor Location with Wi-Fi Fingerprinting", In Proceedings of IEEE Applied Imagery Pattern Recognition Workshop: Sensing for Control and Augmentation, Oct. 23, 2013, 8 pages.

Zhou, et al., "Enhanced Wi-Fi Fingerprinting with Building Structure and User Orientation", In Proceedings of IEEE 8th International Conference on Mobile Ad-hoc and Sensor Networks, Dec. 14, 2012, pp. 219-225.

"Broadcom Enables Pinpoint Indoor Location Technology with Latest 5G WiFi SoC", Published on: Apr. 1, 2014 Available at: http://www.broadcom.com/press/release.php?id=s836818.

"Wi-Fi Alliance, Location TTG Timeline", Retrieved on: Jul. 1, 2015 Available at: https://groups.wi-fi.org/login?back=https%3a%2f%2fgroups.wi-fi.org%2fapps%2forg%2fworkgroup%2flocation_ttg%2fdownload.php%2f56767%2fLocation%20OTTG%20-%20OTTG%20Timeline%20-%2020141217.pptx.

"Wi-Fi Alliance, NAN Release 2 Marketing Requirement Document", Retrieved on: Jul. 1, 2015 Available at: https://groups.wi-fi.org/login?back=https%3a%2f%2fgroups.wi-fi.org%2fapps%2forg%2fworkgroup%2fwfa-nanmktg%2fdownload.php%2f60247%2fNAN2_MRD%20r05.docx.

* cited by examiner

BULK FINE TIMING MEASUREMENT ALLOCATION MESSAGE

BACKGROUND

The role of today's mobile devices—e.g., smart phones, mobile tablets, and wearable computing devices—has expanded dramatically as these devices have proliferated. People do far more on their mobile devices than just make phone calls or access the Internet. New and useful applications for mobile devices are being developed at rapid pace, and many of these applications use location-detection services to perform tasks. These devices communicate through radio waves over dedicated and varying frequencies or dedicated segments of the electromagnetic spectrum. The ability to estimate the relative distance between mobile devices is important for a number of wireless device applications that require location awareness.

Global Positioning System (GPS) solutions do not perform well indoors and provide somewhat weak location-detection precision. Another location-detection service being deployed is Wi-Fi fingerprint, but this technique uses a Received Signal Strength Indication (RSSI) that provides low spatial resolution. An additional inconvenience for Wi-Fi fingerprint technology is the need for a previous calibration phase, which must be performed whenever the physical topology changes significantly. Moreover, hardware-implemented solutions, such as the manipulation of physical layer (PHY) signal properties—e.g., through signal phases of antennas and round-trip time ends—require all new hardware to be developed or managed. Location-detection services should focus on procedures that enhance accuracy beyond the RSSI barrier and then can operate effectively indoors without having to reconfigure complex PHY layers.

If location-detection services use contention-based wireless technologies (e.g., Wi-Fi), performance degradation occurs in dense deployment scenarios due to the many nodes vying or transmitting for limited frequency bandwidth. For example, a large number of mobile devices in the same geographical area may have to compete to gain access to one or more radio frequency (RF) channels.

SUMMARY

The disclosed examples are described in detail below with reference to the accompanying drawing figures listed below. The below Summary is provided to illustrate some examples disclosed herein, and is not meant to necessarily limit all examples to any particular configuration or sequence of operations.

Some examples are directed to generating a bulk fine timing measurement (BFTM) allocation message capable of organizing mobile computing devices in a given area to transmit timing measurement messages. In some examples, a processor of a scheduling mobile computing device identifies other mobile computing devices in the area and determines a time of delivery (TOD) for the BFTM allocation message. The processor also obtains a contention-free period for the other computing devices to transmit the timing measurement messages, determines a scheduling order for the other mobile computing devices to transmit the timing measurement messages, and generates the BFTM allocation message to include the TOD, the contention-free period, and the scheduling order. The BFTM allocation message is transmitted to the other computing devices, which may respond in due course during schedule periods of the contention-free period with the timing measurement messages.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
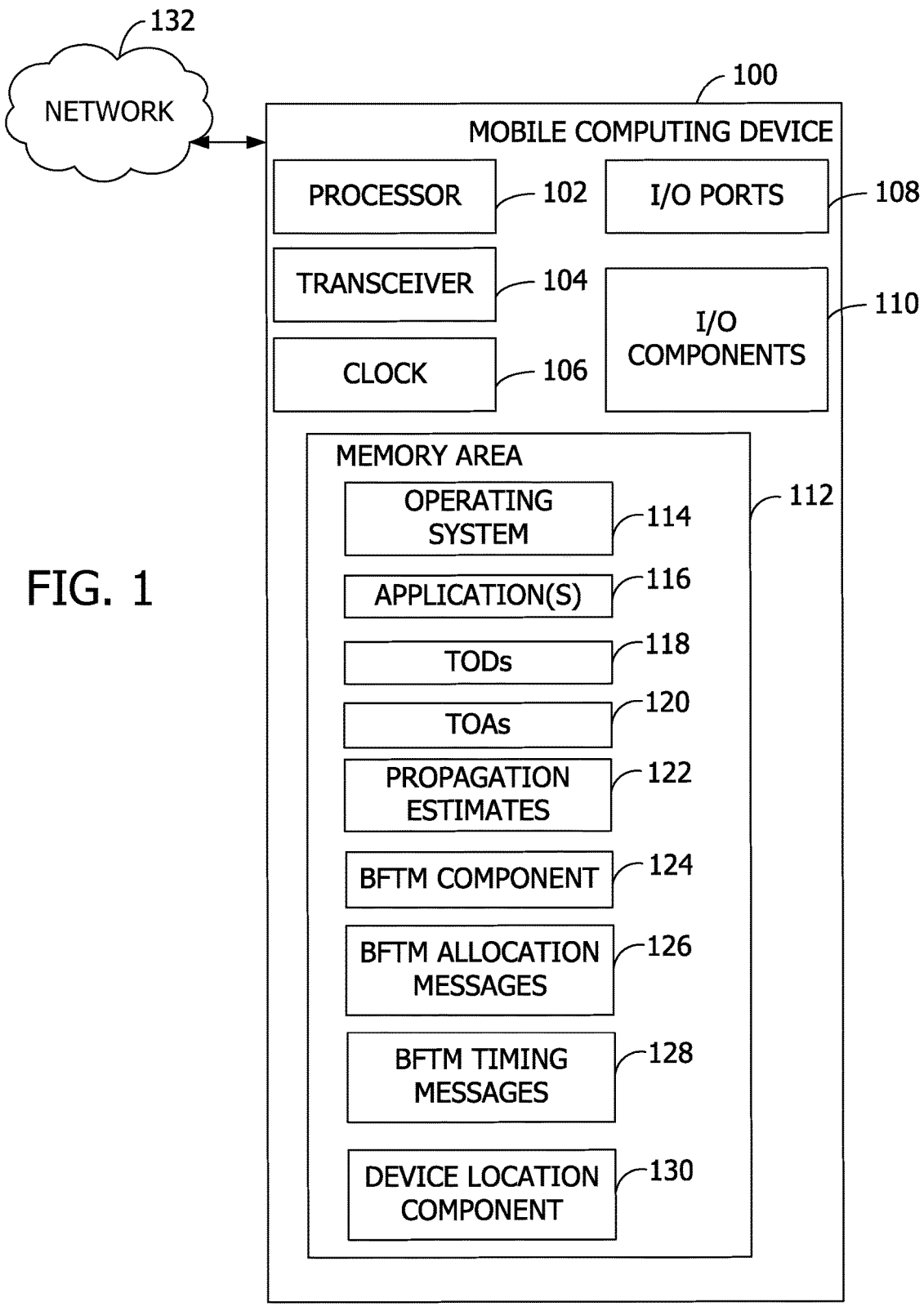
FIG. 1 is a block diagram illustrating an example of a computing device configured to perform location-detections services.

The IEEE 802.11 standard (otherwise known as Wi-Fi) provides some mechanisms to determine the locations of mobile devices using a "fine timing measurement" (FTM) procedure. But the Wi-Fi FTM procedures are very signal-intensive, demanding numerous transmissions to be carried out across somewhat limited wireless frequencies. Consequently, conventional Wi-Fi FTM is not scalable to accommodate location services indoors for large number of mobile computing devices. More specifically, the Wi-Fi fine timing measure requires a sending station to transmit a sender TOD ($TOD_{snd}$) to a receiving station at time T1. The receiving station must then determine a "time of arrival" ($TOA_{rcv}$) at time T2 and transmit the TOA and a time of acknowledgment ($T-ACK_{rcv}$) back to the sending station at time T3. The sending station assigns its own TOA (i.e., $TOA_{snd}$) at time T4 when the sending station receives $TOA_{rcv}$ and $T-ACK_{rcv}$ from the receiving station. The sending station can then compute the propagation delay between the two station—and consequently locate the receiving station relative to the sending station—based on the four different times: T1, T2, T3, and T4.

This technique requires several messages and timing parameters to be passed back and forth, cluttering up radio frequencies in large areas with many different mobile devices. The current Wi-Fi fine timing measurement technique cannot facilitate location services for large numbers of mobile devices. The number of message exchanges (M) for performing a complete graph of timing measurements among any given number of stations (n) in geographical proximity can be shown by the following Equation 1:

$$M = 2 * \frac{n!}{(n-2)!} = 2*n*(n-1) \tag{1}$$

As shown in Equation 1, the number of messages quadratically varies based on the number of stations sending FTM messages. With only a finite bandwidth of RF frequencies to transmit messages across in a given area, either the number of stations must be reduced or the number of messages. Examples disclosed herein help reduce the latter by batching TOAs and TODs that would normally be included in multiple FTM messages into a single BFTM message.

Examples disclosed herein are directed to systems, devices, methods, and computer-storage memory for generating and transmitting BFTM messages between mobile computing devices within proximity to each other in a given area, using low signaling overhead and diminished channel contention. In some examples, the disclosed mobile computing devices generate BFTM allocation messages that include a TOD, a scheduling order for other mobile computing devices, and scheduling order specifying when the other mobile computing devices are scheduled to transmit timing measurement messages (e.g., FTM or BFTM). The BFTM allocation message is broadcast, in some examples, to the other mobile computing devices, organizing them to transmit the timing measurement messages in the scheduled order. This organization of the other mobile computing devices to transmit only during scheduled periods helps reduce the contention of messages being sent across available channels.

In some of the disclosed examples, mobile computing devices generate, transmit, and use a "BFTM allocation message," which includes various message frames, to multiple other mobile computing devices within a particular area. In some examples, the message frames of the BFTM allocation message include a TOD indicative of the time the BFTM allocation message is transmitted; a designation of a number of other mobile computing devices (e.g., station B, station C, and so on); an allocation of a contention-free time period where at least a subset of the other of the mobile computing devices will transmit BFTM or FTM timing messages; a scheduling order for a subset of the mobile computing devices to transmit in a particular order (e.g., station B transmits at time T2, station C transmits at time T3, station D transmits at time T4, and so forth). Additional or alternative information may be included in the BFTM allocation message, including the frame elements disclosed herein and depicted in the accompanying drawings.

In some of the disclosed examples, mobile computing devices generate, transmit, and use a "BFTM timing message," which includes message frames, during the allocated time in a contention-free period and according to the scheduling order indicated by the BFTM allocation message. In some examples, the message frames of the BFTM timing message include a TOD indicative of the time the BFTM timing message is transmitted; multiple TOAs, including the TOA of the BFTM allocation message and TOAs of previously received FTM or BFTM timing or allocation messages from other mobile computing devices; and one or more propagation timing estimates corresponding to the propagation time of messages from the other mobile computing devices (e.g., messages station B received from C, D, and E) or from the mobile computing device sending the BFTM allocation message (e.g., BFTM allocation message received by station B from station A).

The BFTM timing messages may include multiple TOAs related to messages received from other mobile computing devices. For example, mobile device A may generate a BFTM allocation message with an assigned TOD to mobile device B, and mobile device B may respond back with a BFTM timing message that includes its own TOD, the TOA of the message from mobile device A, and TOAs of previously received messages from other computing devices (e.g., devices C, D, E, and beyond).

Batching these additional TOAs of the messages received by mobile device B from the other mobile devices into the BFTM timing message back to mobile device A reduces the need for mobile device A to separately communicate with the other mobile devices, which, when compounded across multiple devices dramatically reduces the above quadric relationship of messages (M) to devices (n) experienced in the aforesaid FTM procedure to the following relation shown in Equation 2:

$$M=(2*n)-1 \qquad (2)$$

As shown in Equation 2, the number of messages varies linearly—instead of quadratically—with the number of devices, providing a scalable model for rendering indoor location services to accommodate far more mobile devices than conventional FTM location procedures.

Reducing the number of messages being exchanged reduces processor, memory, and transmission loads of today's mobile computing devices during location detection. It also moves devices away from having to GPS, line-of-sight, or Wi-Fi fingerprint and more complicated hardware-specific (e.g., PHY) configurations. Additionally, the BFTM messages and procedures disclosed herein provide increased reliability for location services, and enhance the user experience; whereas, older technologies typically can only locate devices within a range of 3 m. Moreover, the exchange of BFTM messages may be conducted indoors and do not require unobstructed lines of sight from satellites, as required by GPS.

Throughout this disclosure, the terms "mobile computing device" and "station" are used interchangeably. One skilled in the art will understand and appreciate that a "station," mobile computing device (e.g., a smart phone, a mobile tablet, a wearable device, Wi-Fi terminal, etc.) may be referred to simply as a station. Additionally, this disclosure reference "timing measurement messages," which may include BFTM messages or FTM messages. The former refers to the specific BFTM messages disclosed herein that include batched TOAs from multiple mobile computing devices, TODs, propagation time estimates, or a combination thereof. And the latter includes standard FTM messages, such as the messages and procedures described in the forthcoming 802.1REV-mc standard (to be called 802.11-2016[2]).

Having generally provided an overview of some of the disclosed examples, attention is drawn to the accompanying drawings to further illustrate some additional details. The illustrated configurations and operational sequences are provided for to aid the reader in understanding some aspects of the disclosed examples. The accompanying figures are not meant to limit all examples, and thus some examples may include different components, devices, or sequences of operations while not departing from the scope of the disclosed examples discussed herein. In other words, some examples may be embodied or may function in different ways than those shown.

FIG. 1 is a block diagram illustrating an example of a mobile computing device 100 configured to perform location-detection services in accordance with some of the disclosed examples. The mobile computing device 100 includes a processor 102, a transceiver 104, a clock 106, input/output (I/O) ports 108, I/O components 110, and a memory area 112. The memory area 112 stores machine-executable instructions and data that include an operating system 114, various applications 116, times of delivery (TODs) 118 and times of arrival (TOAs) 120 for fine timing measurement messages, propagation estimates 122, a BFTM component 124, BFTM allocation messages 126, BFTM timing messages 128, and a device location component 130. The mobile computing device 100 may communicate across a public, private, or hybrid network 130. The depicted mobile computing device 100 is but one example of a suitable computing environment and is not intended to suggest any limitation as to the scope of use or functionality of the disclosed examples. The illustrated parts and components are merely one example of a suitable mobile computing device 100 for detecting the locations of other devices. Alternative or additional components may be used in other examples.

The mobile computing device 100 may take the form of a mobile computing device or any other portable device. In some examples, the mobile computing device 100 may be a mobile phone, laptop, tablet, computing pad, netbook, gaming device, electronic kiosk, wearable device (which may include a natural user interface), portable media player, or other type of computing device that uses touchpads or touch screens. The mobile computing device 100 may also include less portable devices such as desktop personal computers, kiosks, tabletop devices, industrial control devices, wireless charging stations, gaming consoles, servers, electric automobile charging stations, control systems, and the like. Additionally, the mobile computing device 100 may represent a group of processors or other mobile computing devices 100.

The processor 102 may include one or more processing units that are programmed to execute computer-executable instructions for implementing aspects of the disclosure. The instructions may be performed by the processor 102 or by multiple processors within the mobile computing device 100, or performed by a processor 102 external to the mobile computing device 100. In some examples, the operations illustrated in the accompanying FIGS. 5 and 6 may be implemented as software instructions encoded on a computer-readable medium, in hardware programmed or designed to perform the operations, or both. Moreover, in some examples, the processor 102 represents an implementation of analog techniques to perform the operations described herein. For example, the operations may be performed by an analog computing device and/or a digital computing device, or the operations may be implemented by a system on a chip (SoC) or other circuitry (e.g., a plurality of interconnected, electrically conductive elements). Further still, the processor 102 may operate in a virtualized environment, operating across one or more other computing devices or servers.

The transceiver 104 is an antenna capable of transmitting and receiving RF signals. The clock 106 provides a clock signal. I/O ports 108 allow mobile computing device 100 to be logically coupled to other devices including I/O components 110—some of which may be built into the mobile computing device 100—that present, record, receive, or otherwise capture data from a user of the mobile computing device 100 or the surrounding environment. Example I/O components 110 include, without limitation, a speaker, a sound card, a camera, a microphone, a vibration motor, an accelerometer, a joystick, a scanner, a printer, a wireless communication module (e.g., Bluetooth, radio frequency, etc.), global positioning system (GPS) hardware, a photoreceptive light sensor, or other chipsets and circuitry for capturing information related to the user or the user's environment.

Figure 2:
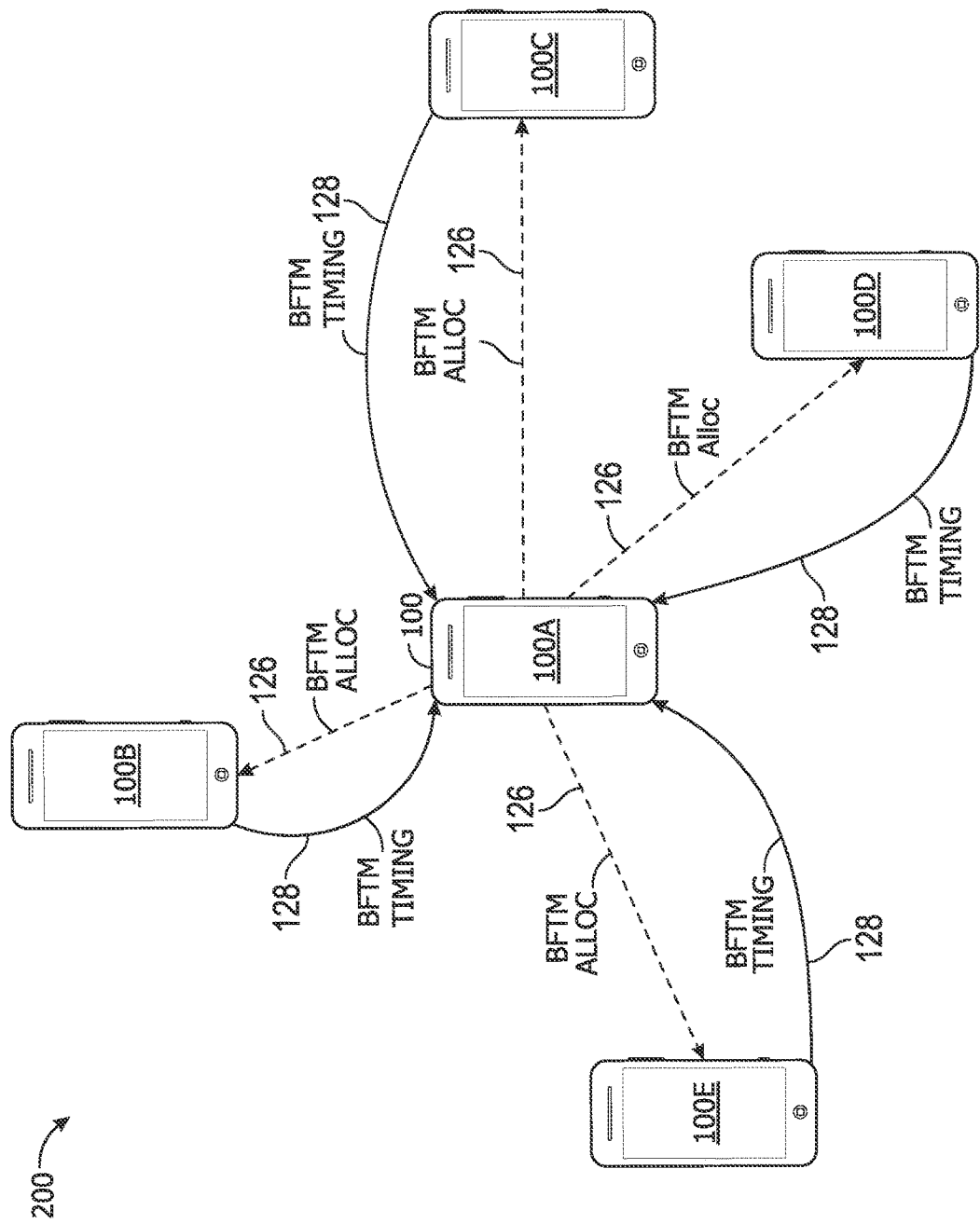
FIG. 2 illustrates a block diagram of mobile computing devices communicating BFTM messages.

The memory area 112 includes any quantity of computer-storage media associated with or accessible by the mobile computing device 100. The memory area 112 may be internal to the computing device 100 (as shown in FIG. 2), external to the mobile computing device 100 (not shown), or both (not shown). Examples of memory in the memory area 112 include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other medium for encoding desired information and be accessed by the mobile computing device 100. Such memory may also take the form of volatile and/or nonvolatile memory; may be removable, non-removable, or a combination thereof; and may include various hardware devices (e.g., solid-state memory, hard drives, optical-disc drives, etc.). For the purposes of this disclosure, however, "computer storage media" does not include carrier waves or propagating signaling.

The operating system 114 is executed by the processor 106 and controls operational aspects of the mobile computing device 100. The applications 116, when executed by the processor 102, operate to perform software or hardware functions on the computing device 100, some of which may require location detection. Examples of applications 224 include, without limitation, mail application programs, web browsers, text editors, spreadsheet programs, calendar application programs, gaming programs, address book application programs, messaging programs, media applications, location-based services, search programs, mobile applications, and the like. The applications 112 may communicate with counterpart applications 112 or services on other mobile computing devices 100, such as web services accessible via a network.

The mobile computing device 100 may communicate over network 130. Examples of computer networks 132 include, without limitation, a wireless network, landline, cable line, fiber-optic line, local area network (LAN), wide area network (WAN), or the like. The network 132 may also comprise subsystems that transfer data between servers or mobile computing devices 100. For example, the network 132 may also include a point-to-point connection, the Internet, an Ethernet, a backplane bus, an electrical bus, a neural network, or other internal system.

To communicate across the network 132, the mobile computing device 100 may also include a network interface card and/or computer-executable instructions (e.g., a driver) for operating a network interface card that provides access to the network. Communication between the mobile computing device 100 and other devices over the network may occur using any protocol or mechanism over any wired or wireless connection. In some examples, the communications interface is operable with short-range communication technologies such as by using near-field communication (NFC) tags, Bluetooth brand communications tags, or the like. Examples of network transfer protocols include, for example but without limitation, the hypertext transfer protocol (HTTP), file transfer protocol (FTP), simple object access protocol (SOAP), or the like. Examples are not limited to any particular communication protocol, message language, or scripting language, as one skilled in the art will appreciate that different languages and protocols may be used to interact with distributed applications.

Figure 3:
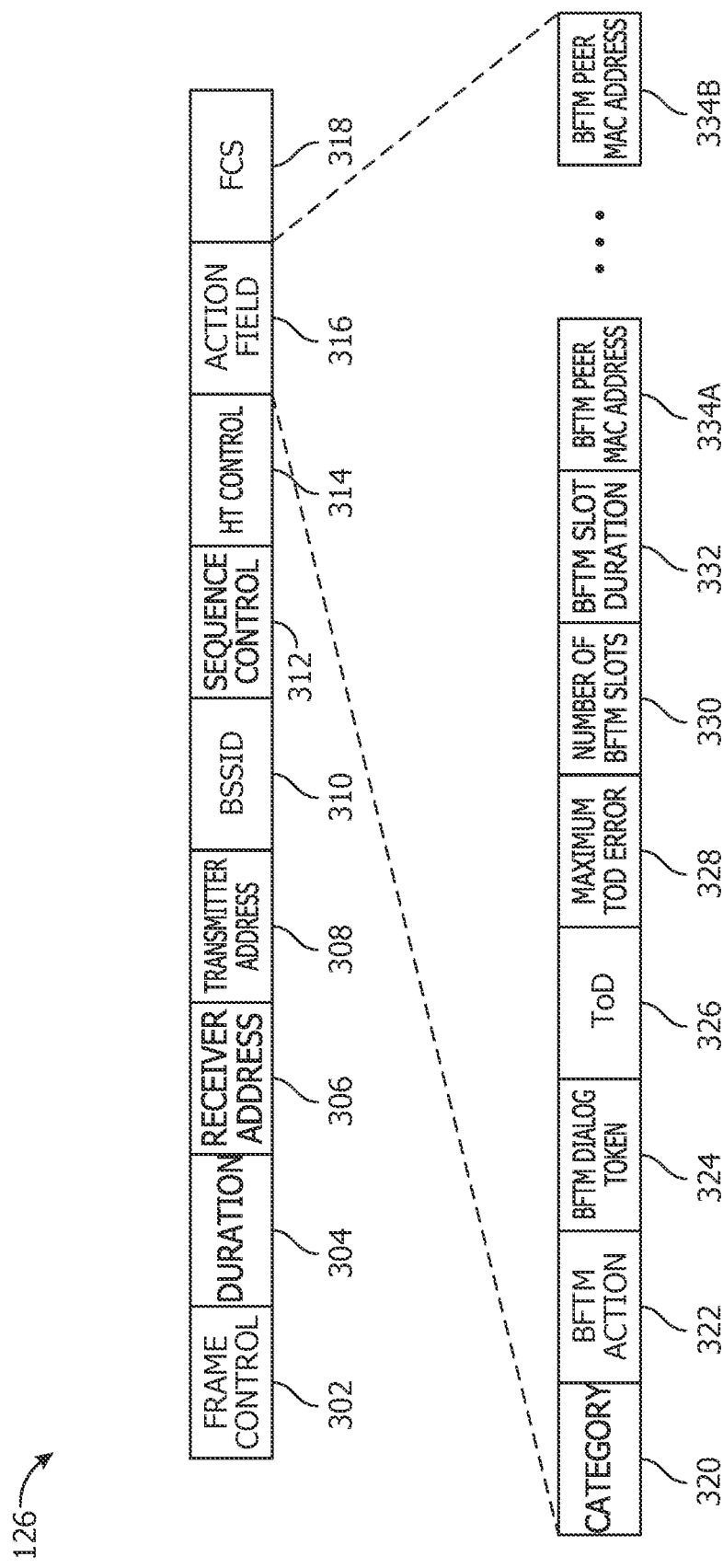
FIG. 3 illustrates a BFTM allocation message.

The TODs 118 are the times that BFTM allocation messages 126 are transmitted from the mobile computing device 100. BFTM allocation messages 126, which are described in more detail below relative to FIG. 3, represent messages that are wirelessly transmitted (e.g., via Wi-Fi™, Bluetooth®, ZigBee®, Long-Term Evolution (LTE), or some other messaging protocol) that include message frames indicating the various disclosed TOD, TOA, device address, message duration, and other information used by the techniques disclosed herein to locate the mobile computing devices 100 within a given area.

The BFTM timing messages 128 represent timing measurement messages (and may alternatively include FTM messages) generated by the BFTM message component 130 for communication to other mobile computing devices 100. In some examples, the mobile computing device 100 is configured to send both the BFTM allocation message 126 and BFTM timing messages 128.

As mentioned above, the BFTM allocation message may include a TOD indicative of the time the BFTM allocation message is transmitted; a designation of a number of other mobile computing devices (e.g., station B, station C, and so on); an allocation of a contention-free time period where at least a subset of the other of the mobile computing devices will transmit BFTM or FTM timing messages; a scheduling order for a subset of the mobile computing devices to transmit in a pre-defined order (e.g., station B transmits at time T2, station C transmits at time T3, station D transmits at time T4, and so forth). Examples of the BFTM allocation messages 126 are illustrated in FIG. 3 and described in more detail below.

In operation, the BFTM component 124 generates the BFTM allocation messages 126 to schedule transmissions of BFTM timing messages 128 from other mobile computing devices 100 in a given area. As described in more detail below, some examples package multiple TOAs related to previously received BFTM messages into an outgoing BFTM allocation message 126 or BFTM timing message 128 to save on the need to transmit multiple communications when identifying the locations of different mobile computing devices 100. For example, a transmitting station may send a BFTM message (allocation or timing) to a receiving station, and the receiving station may respond back with the TOA of that message along with one or more other TOAs for BFTM or FTM messages the receiving station received from other sending stations. In this manner, a single responsive message from the receiving station can include multiple piggybacked TOAs between the receiving station and other stations that can be used by the transmitting station to determine locations of the other stations.

To give a more concrete example, suppose station A transmits a BFTM allocation message to station B, which has previously received BFTM or FTM timing messages from stations C, D, and E for which station B has also stored TOAs upon receipt. In response to receiving station A's BFTM allocation message 126, station B stores a TOA 120 for station A's message and responds back to station A with the stored TOA 120 and other TOAs 120 corresponding to the times station B received BFTM or FTM messages from stations C, D, and E. This effectively provides station A with TOAs 120 for when station B received messages from stations A, C, D, and E, thereby eliminating the need for station A to request these other stations TOAs 120.

Propagation estimates 122 are time estimates that are determined based on the TODs and TOAs of the BFTM allocation messages 126 or the BFTM timing messages 128. The device location component 130 may determine the location of the mobile computing device 100 or other mobile computing devices 100 by applying a particular constant (e.g., the speed of light or approximately 299,792,458 m/s) to the propagation timing estimates 122 to determine, based on the TODs 118 and TOAs 120 how far away the mobile computing devices 100 are from each other. Thus, some examples of this disclosure batch multiple TOAs for a given mobile computing device 100 into a single BFTM allocation or BFTM timing message, which allows the receiving mobile computing device 100 to calculate a relative propagation timing estimate 122 that can be used by the device location component 130 to locate other mobile computing devices 100. In some examples, the device location component 130 uses the calculated relative distances of two or more mobile computing devices 100 to triangulate or map the devices 100. Using the techniques discussed herein, mobile computing devices 100 can be accurately located within a spatial resolution of about 3 cm, which is largely sufficient for most mobile-device applications.

Additionally, the device location component 130 may be configured to identify responding mobile computing devices 100 within a given area or proximity to the mobile computing device 100. In some examples, proximity is determined based on receipt of signaling from the other mobile computing devices 100 in the area. This is but only one technique for determining mobile computing devices 100 within a given proximity. Numerous other techniques may also be used.

FIG. 2 illustrates a block diagram of mobile computing devices 100 communicating BFTM allocation messages 126 and BFTM timing messages 128 in accordance with some examples disclosed herein. The depicted example shows five mobile computing devices 100A-E within a given area (e.g., inside a building, in a marketplace, passing along a street, etc.) and that wirelessly communicate with each other, either over a network 132 or from point-to-point. Of course, the disclosed techniques may include more or fewer than five mobile computing devices 100. For purposes of the disclosure, and aid the reader, the mobile computing device (e.g., 100A) that transmits the BFTM allocation message 126 is referenced as the "scheduling mobile computing device," and the mobile computing devices (e.g., 100B-E) that respond to the BFTM allocation message are referenced as the "responding mobile computing devices." In one example, the scheduling mobile computing device is a group owner from a peer-to-peer group that acts as an initiator for coordinating the transmission of BFTM allocation messages 126 and BFTM timing messages 128.

In some examples, location detection service are provide among the mobile computing devices 100A-E by the scheduling mobile computing device 100A initially and wirelessly broadcasting a BFTM allocation message 126 within a given broadcast area or radius, as shown by the dotted lines. Responding mobile computing devices 100B-E receive the BFTM allocation message 126, assign a TOA at the time of receipt of the BFTM allocation message 126, generate a BFTM timing message 128 to respond back with, and transmit the generated BFTM timing message 128 during the scheduled contention-free time period according to the scheduling instructions in the BFTM allocation message 126. For example, responding mobile computing device 100B may be designated to transmit its BFTM timing message 128 at time T2, responding mobile computing device 100C may be designated to transmit its BFTM timing message 128 at time T3, responding mobile computing device 100D may be designated to transmit its BFTM timing message 128 at time T4, and responding mobile computing device 100E may be designated to transmit its BFTM timing message 128 at time T5.

The illustrated example depicts only one scheduling mobile computing device 100A broadcasting a BFTM allocation message 126 and the responding mobile computing devices 100B-E responding back with BFTM timing messages 126. In some examples, each, or a subset, of the mobile computing devices 100A-E act as the scheduling mobile computing device 100, causing the other mobile computing devices 100 to operate as responding mobile computing devices 100. For example, after the depicted transmission of BFTM timing messages 128 from mobile computing devices 100B-E in response to the BFTM allocation message 126 from mobile computing device 100A, mobile computing device 100B may act as the scheduling mobile computing device 100 by sending a BFTM allocation message 126 that causes mobile computing devices 100A and C-E to respond with BFTM timing messages 128. Similarly, mobile computing devices 100C-E may also operate—either in sequence (in some examples)—as the scheduling mobile computing device 100, causing the rest of the mobile computing devices 100A-E to respond with BFTM timing messages 128.

FIG. 3 illustrates a BFTM allocation message 126 in accordance with some examples. BFTM allocation message 126 includes several frames 302-350B that individually include various octets of information. Octet quantities are provided above each frame. The illustrated BFTM allocation message 126 of FIG. 3 is but one example. Other examples may represent information in other binary, hexadecimal, or other formats; use different sets of octets; include different frames 302-350B than those illustrated; or rearrange the frames 302-350B in alternative sequences. To further illustrate the given example, the individual frames are discussed below. Not all of the shown frames 302-350B are included in all examples.

Frame control 302 indicates the type of frame being transmitted, which may include a designation for an acknowledgment (ACK) frame, a BFTM allocation frame 126, a BFTM timing frame 128, or some other type of frame. Duration 304 indicates the time or period of the BFTM allocation message 126. Receiver address 306 indicates a unique address (e.g., media access control or "MAC") address of the destination mobile computing device 100 to receive the BFTM allocation frame 126, and transmitter address 308 indicates the scheduling mobile computing device 100 transmitting the BFTM allocation message 126. BSSID 310 identifies the network or a wireless access point (WAP) of the scheduling mobile computing device 100. Sequence control 312 indicates the sequence number of the BFTM allocation message 126. HT control frame 314 indicates the type of message of the BFTM allocation message 126 (e.g., a management message indication). FCS 318 is a checksum value.

Action field 316 provides additional information relevant to BFTM timing message 128 scheduling, TODs, TOAs, and the like. Action filed 316 includes the following frames: category 320, BFTM action 322, BFTM dialog token 324, TOD 326, maximum TOD error 328, number of BFTM slots 330, BFTM slot duration 332, and the BFTM peer MAC addresses 334A of the responding mobile computing devices being scheduled. Category 320 and BFTM action 322 are implementation fields that designate the message as being a BFTM allocation message 126.

To allow multiple parallel BFTM operations from different subsets of mobile computing devices 100 to occur, BFTM dialog token 324 is used to identify the realization (or specific BFTM sequence) for BFTM timing messages 128 to reference. Different BFTM dialog tokens 324 may indicate different BFTM transactions. For example, one BFTM dialog token 324 may indicate BFTM operations occurring when the mobile computing device 100A is the scheduling mobile computing device 100. In some examples, multiple BFTM operations are occurring at the same time, so the BFTM dialog token 324 provides a way to distinguish between the BFTM operations. BFTM timing messages 128 responding to one particular BFTM allocation message 126 with a given TOD 118 may respond with different TOA values than BFTM timing messages responding to a completely different BFTM allocation message 126. Thus, using the BFTM dialog token 324 allows the mobile computing devices 100 to respond to any other mobile computing device 100 initiating BFTM operations.

TOD 326 is the time of delivery of the BFTM allocation message 126, and may be captured from the clock 106. Maximum TOD error 328 provides an estimation of the maximum TOD error allotted to specific chipsets of the scheduling mobile computing device 100. Maximum TOD error 328 may be set by the manufacturer of chipsets at the PHY layer. In some examples, TOD 326 and Maximum TOD error 328 define the TOD and the maximum tolerable TOD measurement in multiples of 0.1 μs.

The number of BFTM slots 330 indicates the number of transmission slots scheduled for the mobile computing devices 100. Following the example shown in FIG. 2, a multiple (e.g., 1, 2, 3) of five slots may be indicated to account for the mobile computing devices 100A-E. For example, ten slots may be specified allowing each mobile computing device 100A-E to transmit a BFTM timing message 128. BFTM slot duration 332 indicates the time duration of the exclusive channel reservation for each BFTM transmission. Finally, a varying number of instances of BFTM peer MAC addresses 334A-N are provided to represent the MAC addresses of each mobile computing device 100 allocated by the BFTM allocation message 126 to transmit the BFTM timing messages 128. For example, mobile computing device 100B may be scheduled to transmit at time T2, mobile computing device 100C may be scheduled to transmit at time T3, mobile computing device 100E may be scheduled to transmit at time T4, mobile computing device 100A may be scheduled to transmit at time T5, mobile computing device 100B may be scheduled to transmit at time T6, mobile computing device 100C may be scheduled to transmit at time T7, and mobile computing device 100E may be scheduled to transmit at time T8, and mobile computing device 100A may be scheduled to transmit at time T9. In some examples, the scheduled order is repeated or reversed after the final time T9.

As for the channel access mechanism utilized for acquiring channel access rights for transmitting the BFTM allocation frame 126, three exemplary (but non-limiting) examples are disclosed herein. In the first example, the scheduling mobile computing device 100 contends regularly for gaining channel access via carrier sense multiple access with collision avoidance (CSMA/CA) techniques, as used in a distributed coordination function (DCF) mode. In a second example, a Request-To-Transmit/Clear-To-Transmit (RTS/CTS) frame exchange is performed between the scheduling and one or more responding mobile computing devices prior to the transmission of the BFTM allocation frame 126. This may be done to increase the odds that there will be no collisions for the transmission of the BFTM allocation message 126 by setting the network allocation vector (NAV) on the mobile computing device 100 to receive the RTS/CTS frames for the exact or nearly exact duration of the BFTM allocation message 126. In a third example, an a-priori negotiation initiated by the scheduling mobile computing device 100 is conducted among a subset of responding mobile computing devices 100 of interest as to define repeating fixed-duration time intervals during which all the mobile computing devices 100 involved (scheduling and responding) are scheduled to avoid accessing the channel (e.g., setting NAVs) and will wait for the transmission of the BFTM allocation message 126.

In alternative examples of the BFTM allocation message 126 aimed at reducing even further the signaling overhead, the BFTM peer MAC address field 334 is replaced by a "BFTM Peer Node ID" frame that indicates a node identifier for the mobile computing device 100 allocated for transmitting a BFTM timing message 128. The algorithm for node ID allocation of each mobile computing device 100 may vary in different instances and is beyond the scope of this disclosure.

One positive aspect about the reception of the BFTM allocation message 126 by any other mobile computing device 100 is that the Duration frame 304 in the BFTM allocation message 126 sets the NAV of responder mobile computing devices 100 for the duration of all subsequent BFTM slots 330 allocated, thus effectively creating a contention-free period. This allows each subsequent BFTM frame sent during the BFTM slots to not contend for accessing a transmission channel. In other words, the BFTM frames can be transmitted in a contention-free manner. As such, the BFTM measurement allocations determined by the BFTM allocation message 126 allow diminished signaling overhead and increased efficiency in dense deployment situations.

Another positive aspect regarding the TOD 326 frame in the BFTM allocation message 126 is the input to timing measurements to be performed by all mobile computing devices 100 allocated to transmit BFTM frames by the BFTM allocation message 126. As such, a single message (BFTM allocation message 126) will serve as the starting point for multiple FTM procedures at once. While current FTM procedure, as defined by the IEEE 802.11 standard, requires a specific pair of frame exchanges to perform timing measurement between any two STAs. The disclosed examples increase timing measurement efficiency in terms of signaling overhead.

Still another positive aspect about the multiple timing measurements triggered by the TOD 326 field in the BFTM allocation message 126 is that triggering multiple timing measurements will require a single channel access acquisition; whereas, the IEEE 802.11 FTM standard requires that each measurement have a first FTM Action frame acquire channel access independently. The disclosed examples enhance even further the multiple timing measurements, as the probability of collision (and consequent loss of packets) is diminished.

The illustrated frames of FIG. 3 are provided merely for explanatory purposes to illustrate two different example implementations. All implementations are not limited to the depicted frames. Alternative examples include additional and alternative frames without departing from the scope of this disclosure.

Figure 4:
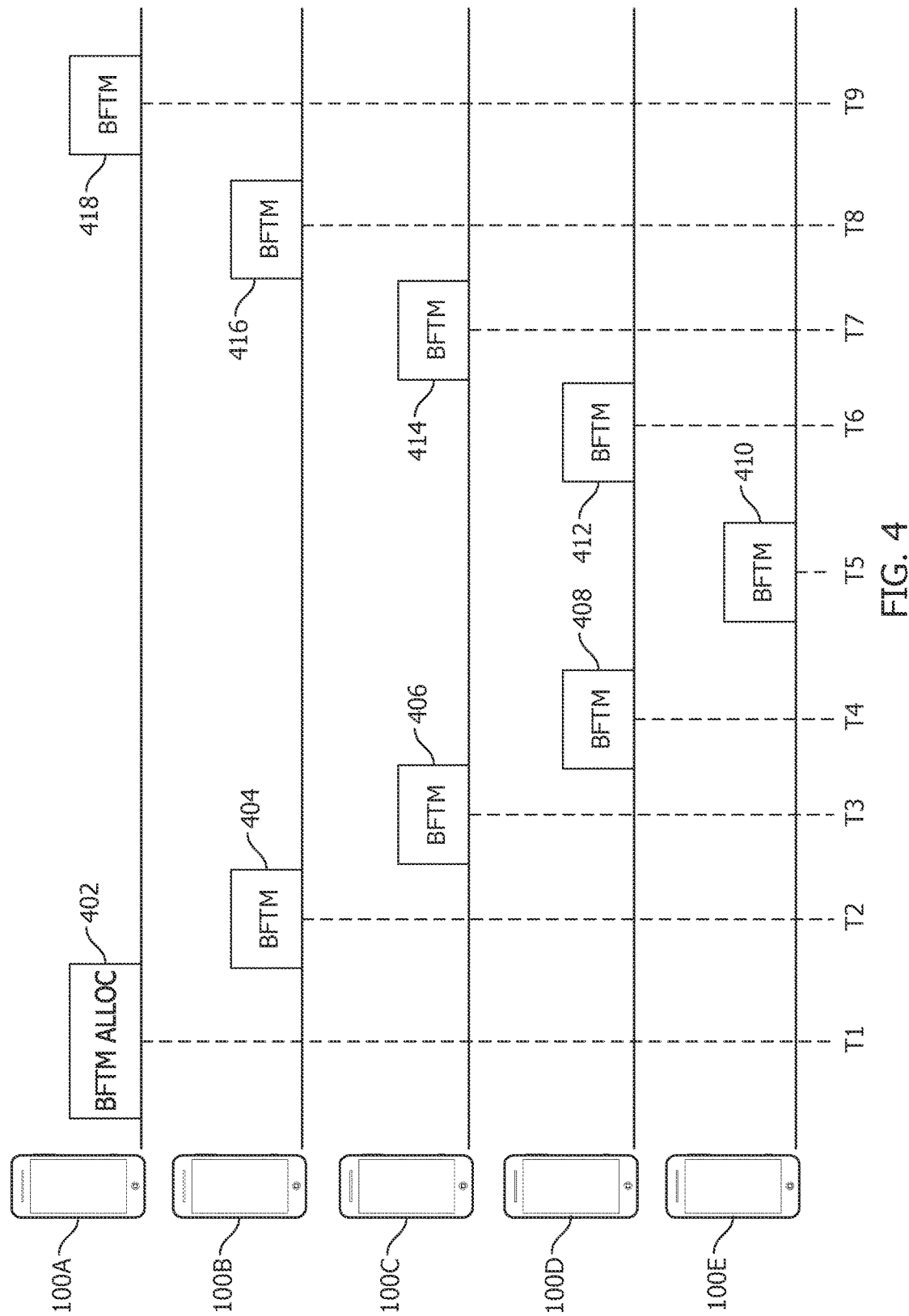
FIG. 4 is a timing diagram showing various mobile computing devices communicating different timing measurement messages at given times.

FIG. 4 is a timing diagram showing various mobile computing devices 100A-E communicating different BFTM messages 402-418 at given times T1-T9 in accordance with some examples. A scheduling mobile computing device 100A broadcasts a BFTM allocation message 126 (402) at time T1 that schedules a set of responding mobile computing devices 100B-E to transmit BFTM timing messages 128 or FTM messages (402-418) at times T2-T9. The BFTM allocation message 126 may also schedule the responding mobile computing device 100B-E to transmit again at times T10-T18 (not shown for clarity) in reverse order.

In some examples, the illustrated pattern of transmissions 402-418 and corresponding times T1-T9 are scheduled in BFTM allocation message 126 (402) using the following messages frames: BFTM slots 328, BFTM slot duration 332, and the BFTM peer MAC addresses 334A-N. In particular, BFTM slots 328 specifies the number of slots open for responding mobile computing devices 100A-E (device A acting a responding mobile computing device 100 at time T9) to individually transmit. BFTM slot duration 332 designates the amount of time for each to transmit, which may be a specific unit of time (e.g., 1 ns) or some multiple of time (e.g., two multiples of 0.1 µs). In other examples, the amount of time is uniform between all responding mobile computing devices 100B-E while. In still other examples, the time varies (e.g., T2-T3 is different than T4-T5), either between different scheduled transmissions or along a progression of transmissions (e.g., times between T1-T5 are different than times between T5-T9).

During their respective scheduled BFTM transmission times, mobile computing devices 100A-E transmit a BFTM or FTM message that can be captured by the rest of the mobile computing devices 100A-E (in some examples) or just the scheduling mobile computing device 100A (in other examples). In some examples, the BFTM allocation message 126 includes an identifier for the response BFTM or FTM messages in order to associate the response messages to the BFTM allocation message 126. Additionally, the response BFTM or FTM messages may include at least one TOA and indicating when the responding mobile computing devices 100B-E received the BFTM allocation message 126 and a TOD for when the responsive BFTM or FTM message was sent. Further still, the BFTM or FTM messages may also include propagation timing estimates indicative of the propagation time required to transmit the BFTM allocation message 126 to the particular mobile computing devices 100B-E. In some examples, these propagation timing estimates are based on the TOD of the BFTM allocation message 126 and the TOA of the BFTM allocation message 126 at the mobile computing devices 100B-E.

Figure 5:
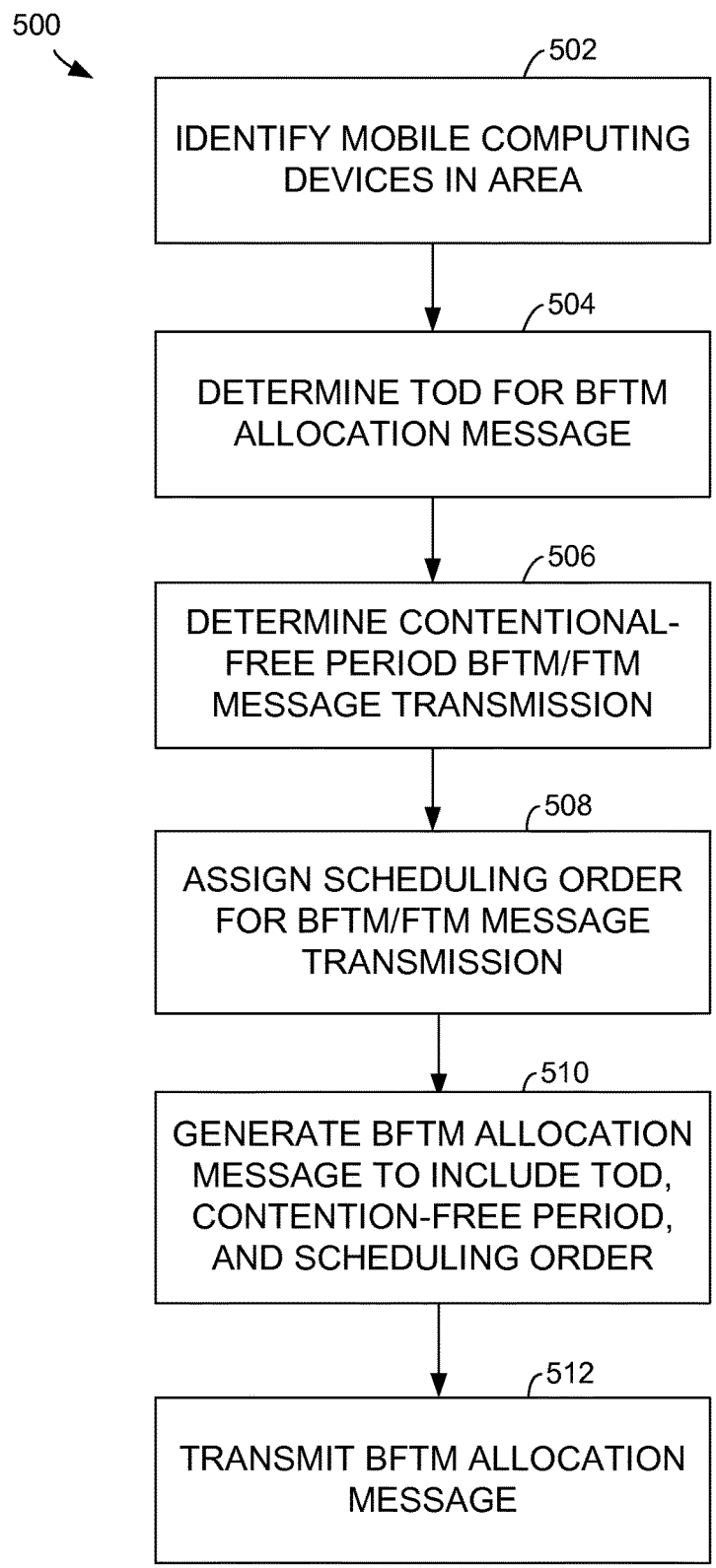
FIG. 5 is a flow chart diagram illustrating a work flow for generating a BFTM allocation message.

FIG. 5 is a flow chart diagram illustrating a work flow 500 for generating a BFTM allocation message 126 in accordance with some examples. According to work flow 500, a scheduling mobile computing device 100 identifies responding mobile computing devices in a particular area, such as an indoor building, as shown at block 502. The scheduling mobile computing device 100 generates a BFTM allocation message 126 in the following manner. A TOD for the BFTM allocation message is determined from a clock of the scheduling mobile computing device 100, as shown at block 504. A contention-free period for timing measurement messages (BFTM or FTM) is determined by the scheduling mobile computing device 100, as shown at block 506. A scheduling order for the responding mobile computing devices 100 to transmit the timing measurement messages is determined by the scheduling mobile computing device 100, as shown at block 508. The BFTM allocation message with frames indicating the TOD, scheduling order, and the contention-free period is then generated and transmitted to the responding computing devices 100, as shown at blocks 510 and 512, respectively.

Figure 6:
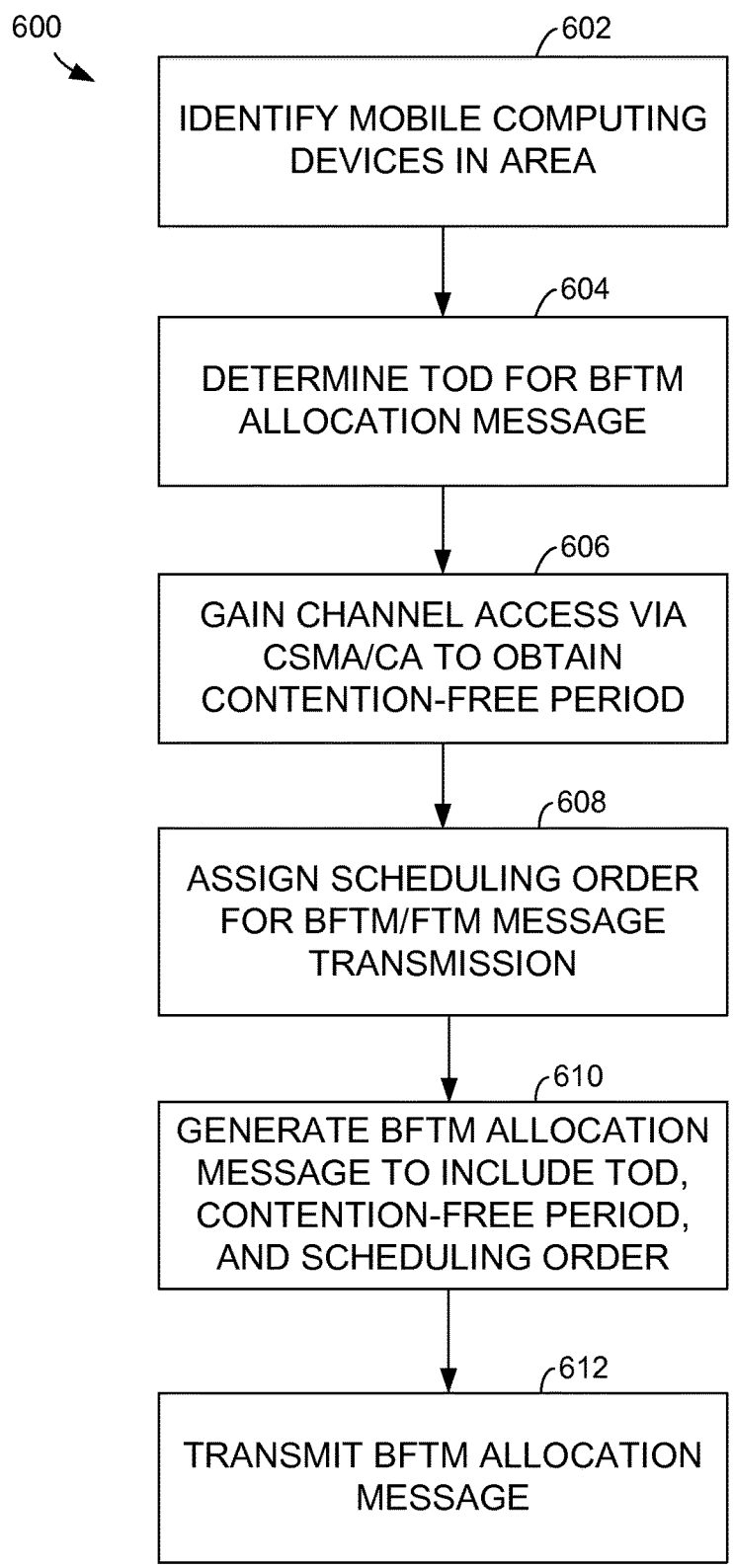
FIG. 6 is a flow chart diagram illustrating a work flow for generating a BFTM allocation message.

FIG. 6 is a flow chart diagram illustrating a work flow 600 for generating a BFTM allocation message 126 in accordance with some examples. According to work flow 600, mobile computing devices are identified in a particular area by a scheduling mobile computing device 100, as shown at block 602. The scheduling mobile computing device 100 generates a BFTM allocation message 126 in the following manner. A TOD for the BFTM allocation message is determined from a clock of the scheduling mobile computing device 100, as shown at block 604. The scheduling mobile computing device 100 gains access via CSMA/CA to obtain a contention-free period for the other mobile computing devices to transmit timing measurement messages (BFTM or FTM), as shown at block 606. A scheduling order for the responding mobile computing devices 100 to transmit the timing measurement messages is assigned by the scheduling mobile computing device 100, as shown at block 608. The BFTM allocation message with frames indicating the TOD, the contention-free period, and the scheduling order is generated and transmitted to the responding computing devices 100, as shown at blocks 610 and 612, respectively.

In some examples, the operations illustrated in FIGS. 5 and 6 may be implemented as software instructions encoded on computer-storage media (e.g., memory), in hardware programmed or designed to perform the operations, or both. For example, aspects of the disclosure may be implemented as an SoC or other circuitry including a plurality of interconnected, electrically conductive elements.

ADDITIONAL EXAMPLES

Some examples are directed to a first mobile computing device that includes a clock, a memory area storing machine-executable instructions for generating a BFTM allocation message, a processor. In some examples, the processor is configured to: identify other mobile computing devices in an area, determine a TOD for the BFTM allocation message, determine a contention-free period for the other computing devices to transmit timing measurement messages, determine a scheduling order for the other mobile computing devices to transmit the timing measurement messages, generate the BFTM allocation message to include the TOD, the contention-free period, and the scheduling order, and transmit the BFTM allocation message to the other computing devices.

Some examples are directed to a first mobile computing device that includes: a clock, a memory area storing machine-executable instructions for generating a BFTM allocation message, and a processor. In some examples, the processor is configured to execute the instructions to: identify other mobile computing devices in an area, determine a TOD for the BFTM allocation message, gain channel access via CSMA/CA to obtain a contention-free period for the other computing devices to transmit timing measurement messages, determine a scheduling order for the other mobile computing devices to transmit the timing measurement messages, generate the BFTM allocation message to include the TOD, the contention-free period, and the scheduling order, and transmit the BFTM allocation message to the other computing devices.

Other examples are directed to transmitting the BFTM allocation message from a first mobile computing device, the BFTM allocation being used to locate mobile computing devices in an area. In some examples transmission of the BFTM allocation includes: identifying other mobile computing devices in the area, determining a TOD for the BFTM allocation message, determining a contention-free period for the other computing devices to transmit timing measurement messages, determining a scheduling order for the other mobile computing devices to transmit the timing measurement messages, generating the BFTM allocation message to include the TOD, the contention-free period, and the scheduling order, and transmitting the BFTM allocation message to the other computing devices.

Alternatively or in addition to the other examples described herein, examples include any combination of the following:
a processor configured to include a first BFTM dialog token in the BFTM allocation message, the BFTM dialog token indicating a BFTM sequence;
a transceiver receiving a second BFTM allocation message from a second mobile computing device;
a second BFTM allocation message including a second BFTM dialog token that is different from the first BFTM dialog token and indicates a first set of BFTM transactions differing form a second set of BFTM transactions associated with the BFTM allocation message;
timing measurement messages reference the BFTM dialog token;
a maximum TOD error in the BFTM allocation message indicating a maximum tolerable TOD measurement error;
the TOD and the maximum TOD error indicate a multiple of a propagation delay time period;
a processor configured to transmit the current BFTM allocation message at the time indicated in the TOD;
a processor configured to include in the BFTM allocation message a number of BFTM slots to be assigned to the other mobile computing devices;
a processor configured to include in the BFTM allocation message a BFTM slot duration indicating one or more time periods for other mobile computing devices to transmit the timing measurement messages;
a processor configured to include a set of addresses associated with the other computing devices in the BFTM allocation message;
addresses of the other computing devices organized in the BFTM allocation message in a sequence indicative of the scheduling order;
a MAC address;
one or more FTM messages;
a BFTM dialog token in the BFTM allocation message, indicating a BFTM sequence;
a processor configured to include at least one member of a group comprising the following frames in the BFTM allocation message: one or more BFTM action frames uniquely identifying the current BFTM allocation message, and a maximum TOD error indicating a maximum tolerable TOD measurement error;
addresses associated with the other computing devices organized in the BFTM allocation message in accordance with the scheduling order;
timing measurement messages received from the other computing devices in response to the BFTM allocation message and in accordance with the scheduling order; and an organized sequence of addresses associated with the other mobile computing devices to indicate times when the other mobile computing devices are scheduled to transmit the timing measurement messages during the contention-free period.

While the aspects of the disclosure have been described in terms of various examples with their associated operations, a person skilled in the art would appreciate that a combination of operations from any number of different examples is also within scope of the aspects of the disclosure.

Exemplary Operating Environment

Although described in connection with an exemplary computing device, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

The examples illustrated and described herein, as well as examples not specifically described herein but within the scope of aspects of the disclosure, constitute exemplary means for generating and transmitting a BFTM allocation message from a scheduling mobile device to other mobile computing devices in a given area. For example, the elements described in FIG. 1, such as when encoded to perform the operations illustrated in FIGS. 5 and 6, constitute exemplary means for a scheduling mobile computing device to identify responding mobile computing devices in a given area; exemplary means for determining a TOD for a BFTM allocation message; exemplary means for determining a contention-free period for the responding mobile computing devices to transmit timing measurement messages, exemplary means for determining a scheduling order for the responding mobile computing devices to transmit the timing measurement messages; exemplary means for generating the BFTM allocation message to include the TOD, the contention-free period, and the scheduling order; and exemplary means for transmitting the BFTM allocation message to the responding computing devices. Additionally or alternatively, the elements described in FIG. 1 constitute exemplary means for gaining gain channel access via carrier sense multiple access with CSMA/CA to obtain a contention-free period for responding mobile computing devices to transmit timing measurement messages; exemplary means for determining a scheduling order for the other mobile computing devices to transmit the timing measurement messages; exemplary means for generating a BFTM allocation message to include the TOD, the contention-free period, and the scheduling order; and exemplary means for transmitting the BFTM allocation message to the responding mobile computing devices.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A first mobile computing device, comprising:
   a clock;
   a memory area storing machine-executable instructions for generating a bulk fine timing measurement (BFTM) allocation message; and
   a processor configured to execute the instructions to:
      identify other mobile computing devices in an area,
      determine a time of departure (TOD) for the BFTM allocation message,
      determine a contention-free period for the other computing devices to transmit timing measurement messages, determine a scheduling order for the other mobile computing devices to transmit the timing measurement messages,
generate the BFTM allocation message to include the TOD, the contention-free period, and the scheduling order, and
transmit the BFTM allocation message to the other computing devices.

2. The first mobile computing device of claim 1, wherein the processor is further configured to include a first BFTM dialog token in the BFTM allocation message, the BFTM dialog token indicating a BFTM sequence.

3. The first mobile computing device of claim 2, further comprising a transceiver receiving a second BFTM allocation message from a second mobile computing device, the second BFTM allocation message comprising a second BFTM dialog token that is different from the first BFTM dialog token and indicates a first set of BFTM transactions differing form a second set of BFTM transactions associated with the BFTM allocation message.

4. The first mobile computing device of claim 2, wherein the timing measurement messages reference the BFTM dialog token.

5. The first mobile computing device of claim 1, wherein the processor is further configured to include in the BFTM allocation message a maximum TOD error indicating a maximum tolerable TOD measurement error.

6. The first mobile computing device of claim 5, wherein the TOD and the maximum TOD error indicate a multiple of a propagation delay time period.

7. The first mobile computing device of claim 1, wherein the processor is further configured to transmit the current BFTM allocation message at the time indicated in the TOD.

8. The first mobile computing device of claim 1, wherein the processor is further configured to include in the BFTM allocation message a number of BFTM slots to be assigned to the other mobile computing devices.

9. The first mobile computing device of claim 8, wherein the processor is further configured to include in the BFTM allocation message a BFTM slot duration indicating one or more time periods for other mobile computing devices to transmit the timing measurement messages.

10. The first mobile computing device of claim 1, wherein the processor is further configured to include a set of addresses associated with the other computing devices in the BFTM allocation message.

11. The first mobile computing device of claim 1, wherein the addresses of the other computing devices are organized in the BFTM allocation message in a sequence indicative of the scheduling order.

12. The first mobile computing device of claim 11, wherein at least one of the addresses is a media access control (MAC) address.

13. The first mobile computing device of claim 11, wherein the timing measurement messages comprise one or more fine timing measurement (FTM) messages.

14. A first mobile computing device, comprising:
a clock;
a memory area storing machine-executable instructions for generating a bulk fine timing measurement (BFTM) allocation message; and
a processor configured to execute the instructions to:
identify other mobile computing devices in an area,
determine a time of departure (TOD) for the BFTM allocation message,
gain channel access via carrier sense multiple access with collision avoidance (CSMA/CA) to obtain a contention-free period for the other computing devices to transmit timing measurement messages,
determine a scheduling order for the other mobile computing devices to transmit the timing measurement messages,
generate the BFTM allocation message to include the TOD, the contention-free period, and the scheduling order, and
transmit the BFTM allocation message to the other computing devices.

15. The first mobile computing device of claim 14, wherein the processor is further configured to include a first BFTM dialog token in the BFTM allocation message, the BFTM dialog token indicating a BFTM sequence.

16. The first mobile computing device of claim 14, wherein the processor is further configured to include at least one member of a group comprising the following frames in the BFTM allocation message:
one or more BFTM action frames uniquely identifying the current BFTM allocation message, and
a maximum TOD error indicating a maximum tolerable TOD measurement error.

17. The first mobile computing device of claim 14, wherein the processor is further configured to specify addresses associated with the other computing devices organized in the BFTM allocation message in accordance with the scheduling order.

18. A method for transmitting a bulk fine timing measurement (BFTM) allocation message from a first mobile computing device, the BFTM allocation being used to locate mobile computing devices in an area, the method comprising:
identifying other mobile computing devices in the area;
determining a time of departure (TOD) for the BFTM allocation message;
determining a contention-free period for the other computing devices to transmit timing measurement messages;
determining a scheduling order for the other mobile computing devices to transmit the timing measurement messages;
generating the BFTM allocation message to include the TOD, the contention-free period, and the scheduling order; and
transmitting the BFTM allocation message to the other computing devices.

19. The method of claim 18, further comprising:
receiving the timing measurement messages from the other computing devices in response to the BFTM allocation message and in accordance with the scheduling order.

20. The method of claim 19, further comprising adding an organized sequence of addresses associated with the other mobile computing devices to indicate times when the other mobile computing devices are scheduled to transmit the timing measurement messages during the contention-free period.

* * * * *